(12) United States Patent
Kent

(10) Patent No.: US 7,631,734 B1
(45) Date of Patent: Dec. 15, 2009

(54) BRAKE USING ELASTOMERIC MEANS

(76) Inventor: Henry Richard Kent, 3223 Poe St., San Diego, CA (US) 92106-1855

( * ) Notice: Subject to any disclaimer, the term of this patent is extended or adjusted under 35 U.S.C. 154(b) by 0 days.

(21) Appl. No.: 12/080,487

(22) Filed: Apr. 4, 2008

(51) Int. Cl.
*F16D 63/00* (2006.01)
(52) U.S. Cl. ..................... 188/82.84; 188/74
(58) Field of Classification Search ............. 188/25, 188/27, 82.7, 82.8, 82.84, 166–169, 185, 188/74
See application file for complete search history.

(56) References Cited

U.S. PATENT DOCUMENTS

| | | | | |
|---|---|---|---|---|
| 650,228 | A | * | 5/1900 | Cattaneo .................. 188/25 |
| 700,349 | A | * | 5/1902 | Madsen .................... 188/25 |
| 1,933,421 | A | * | 10/1933 | Elliotte .................. 188/2 R |
| 2,780,322 | A | * | 2/1957 | Hickle .................... 188/290 |
| 6,745,873 | B1 | | 6/2004 | Chen | |

* cited by examiner

*Primary Examiner*—Christopher P Schwartz

(57) ABSTRACT

A brake mechanism suitable for any type of vehicle that uses no friction whatsoever to stop the rotation of a wheel. Instead it relies on the asymmetrical deformation of an elastomer to absorb the kinetic energy of the wheel and to create a force that the wheel must overcome to keep on rotating.

19 Claims, 5 Drawing Sheets

BRAKE MECHANISM SHOWN AT REST

BRAKE MECHANISM SHOWN AT REST

CROSS-SECTION A-A

BRAKE MECHANISM SHOWN ACTUATED

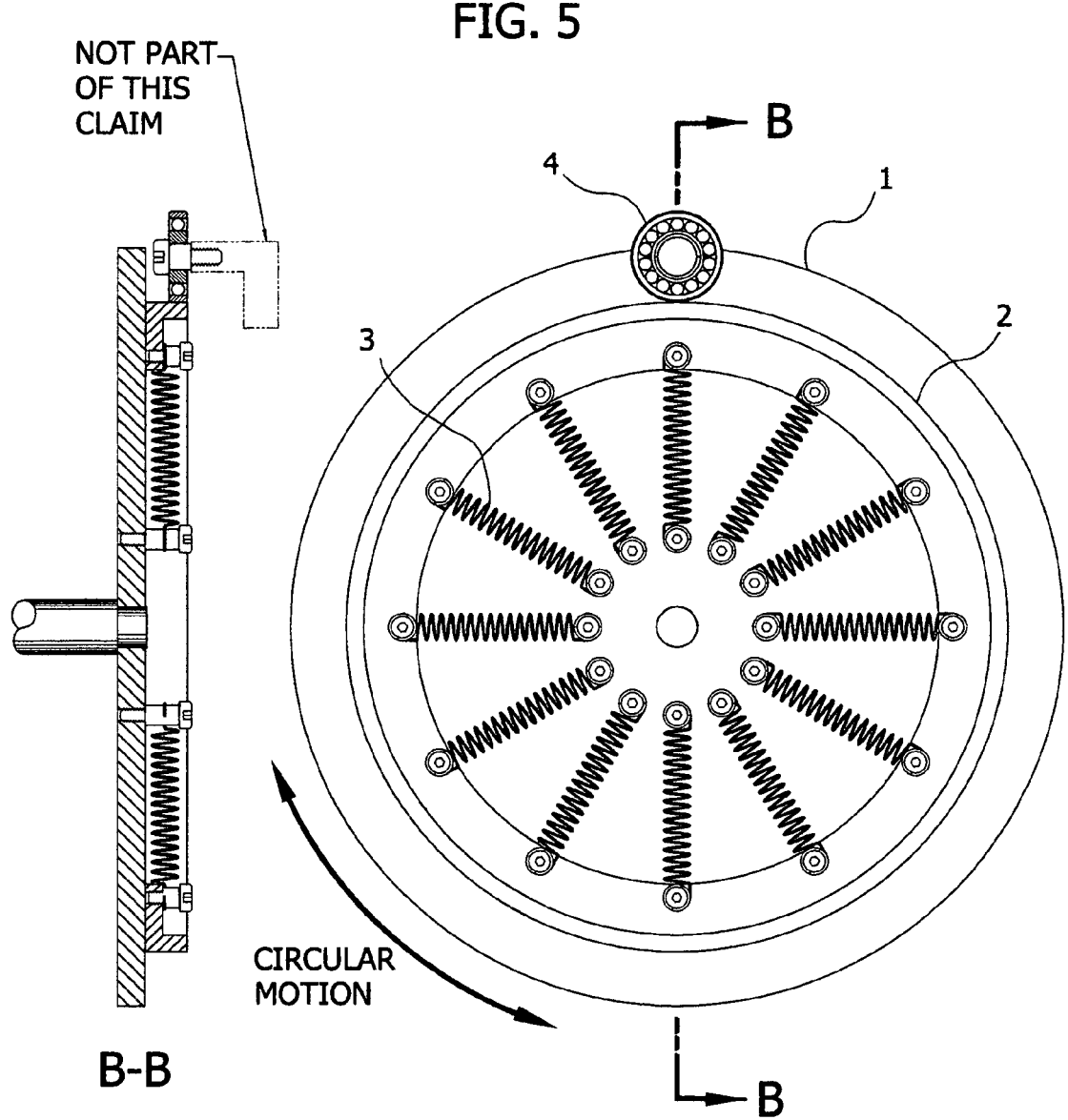
MODIFIED FORM OF CONSTRUCTION - OBVIOUS ALTERNATE CONFIGURATION

BRAKE USING ELASTOMERIC MEANS

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

Presently all vehicles such as cars, trucks, buses, trains, airplanes, etc. . . . use friction to slow down or to stop the kinetic energy of a rotating wheel. Typically, a pad, actuated by hydraulic means, is pressed against either a drum or a disc. Going down a long steep hill, the brake experiences heat and fading and loses a significant and potentially dangerous portion of its effectiveness. Driving in the rain or in the mud, the unprotected drums, discs or pads get slippery, also with a dangerous decrease in braking force.

BRIEF SUMMARY OF THE INVENTION

The present invention does not rely in any way whatsoever on friction to slow down or to stop a rotating wheel. Instead, it depends on the asymmetrical deformation of an elastomeric suspension to achieve much better results. Because no friction is involved, there is no heat, no fading, no wear, no replacement of pads, drums or discs. The braking force is absolutely identical whether the brake is running bone dry, dripping wet or even greasy. The design requires few moving parts, all of which can be designed rugged enough to last the expected life of the vehicle.

A wheel 1 would typically be attached to a vehicle tire possibly in a manner similar to the attachment of a disc brake. This attachment is not part of this claim and would be left to the vehicle manufacturer.

A ring 2 is suspended from the wheel 1 by elastomeric means described in detail elsewhere in this document but shown here schematically as an array of springs. This ring rotates with the wheel.

A roller 4 rides on the inside (or on the outside) diameter of the ring. This roller does not rotate with the ring but on the ring. The support and actuation of this roller is not part of this claim and would be left to the vehicle manufacturer.

Figure 1:
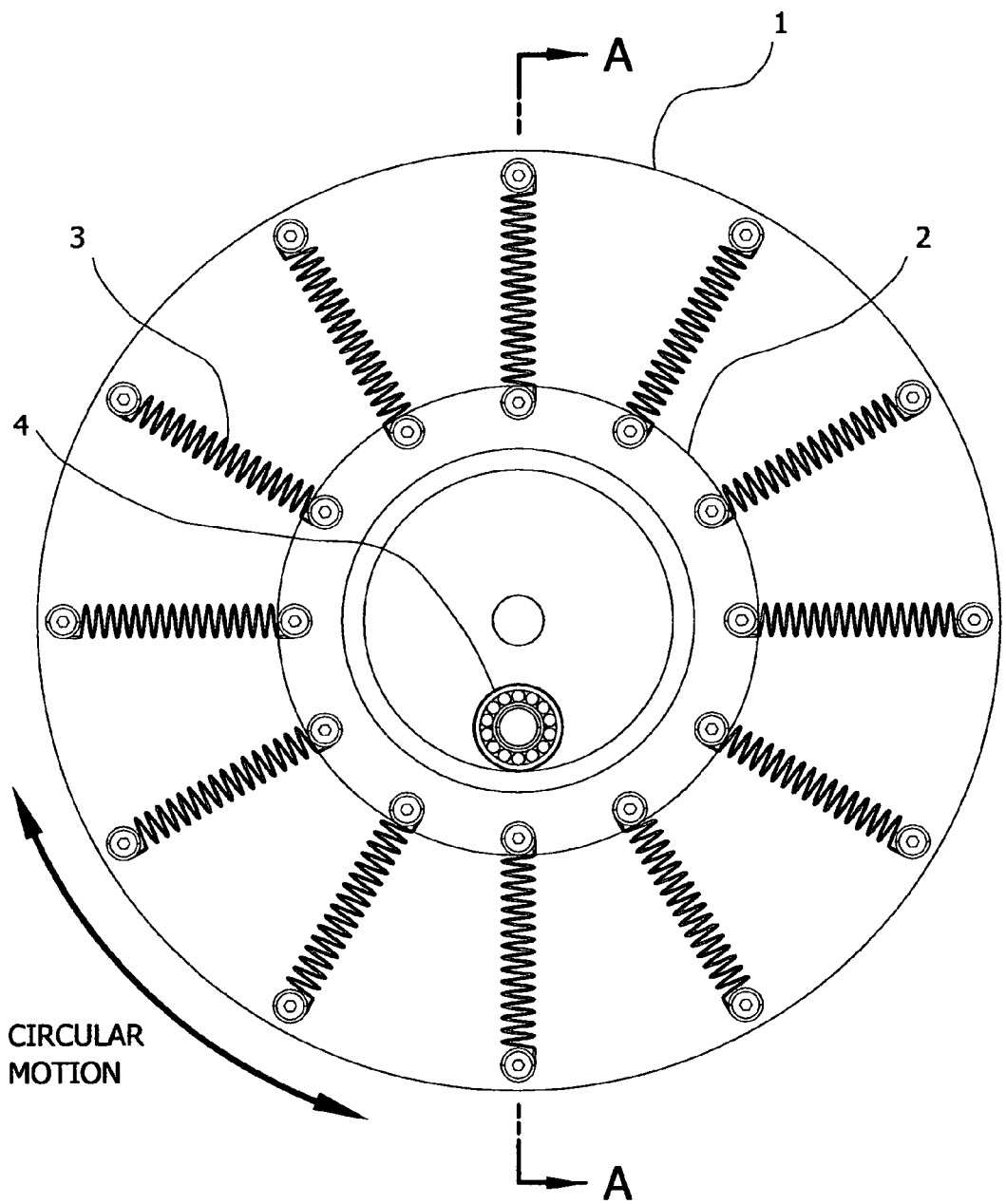
FIG. 1 is a front elevation of a brake mechanism embodying the present invention.
Figure 2:
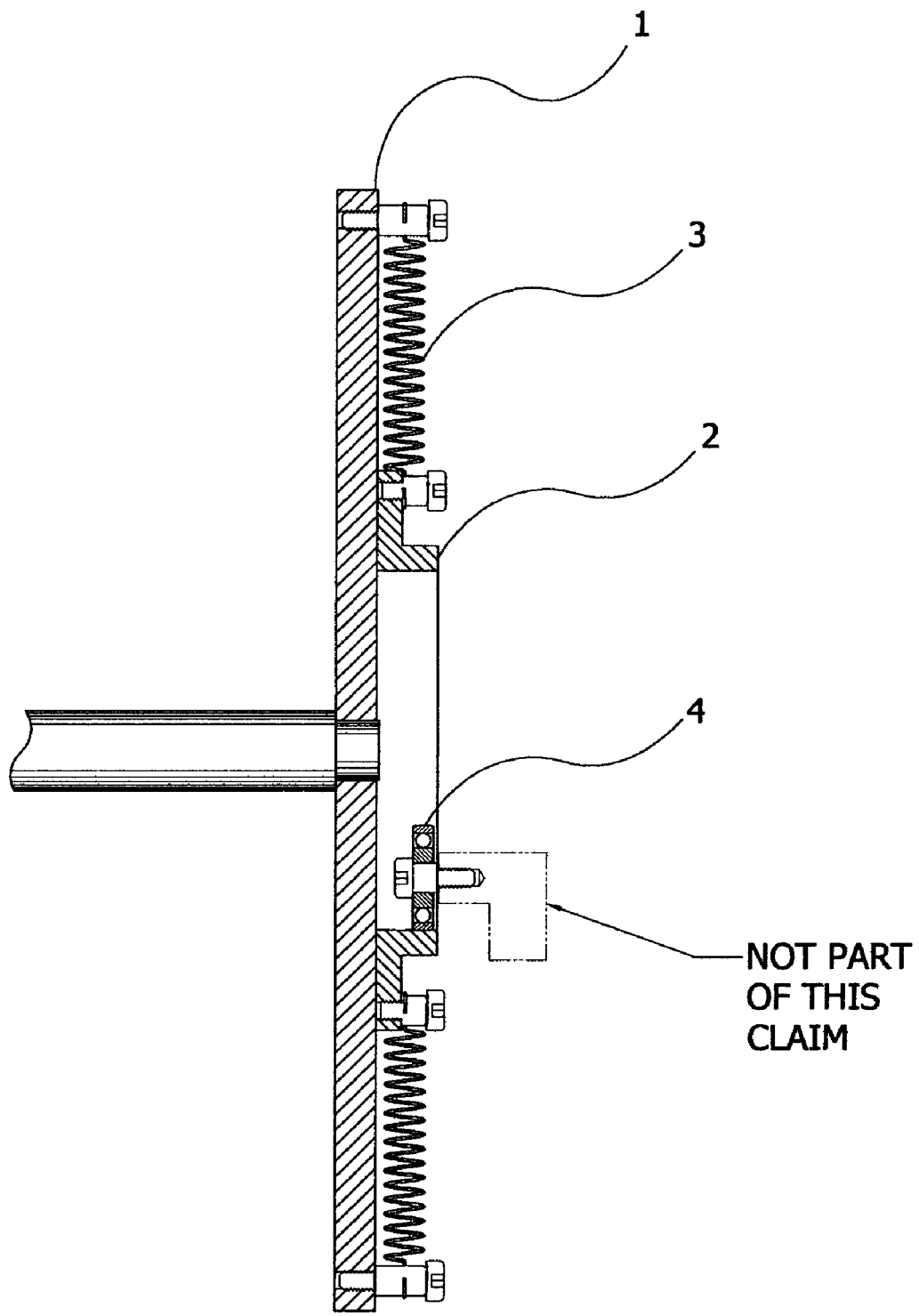

FIG. 2 is a transverse sectional view taken substantially along line A-A of FIG. 1 and looking in the direction of the arrows. For clarity, springs and screws have not been sectioned.

Figure 3:
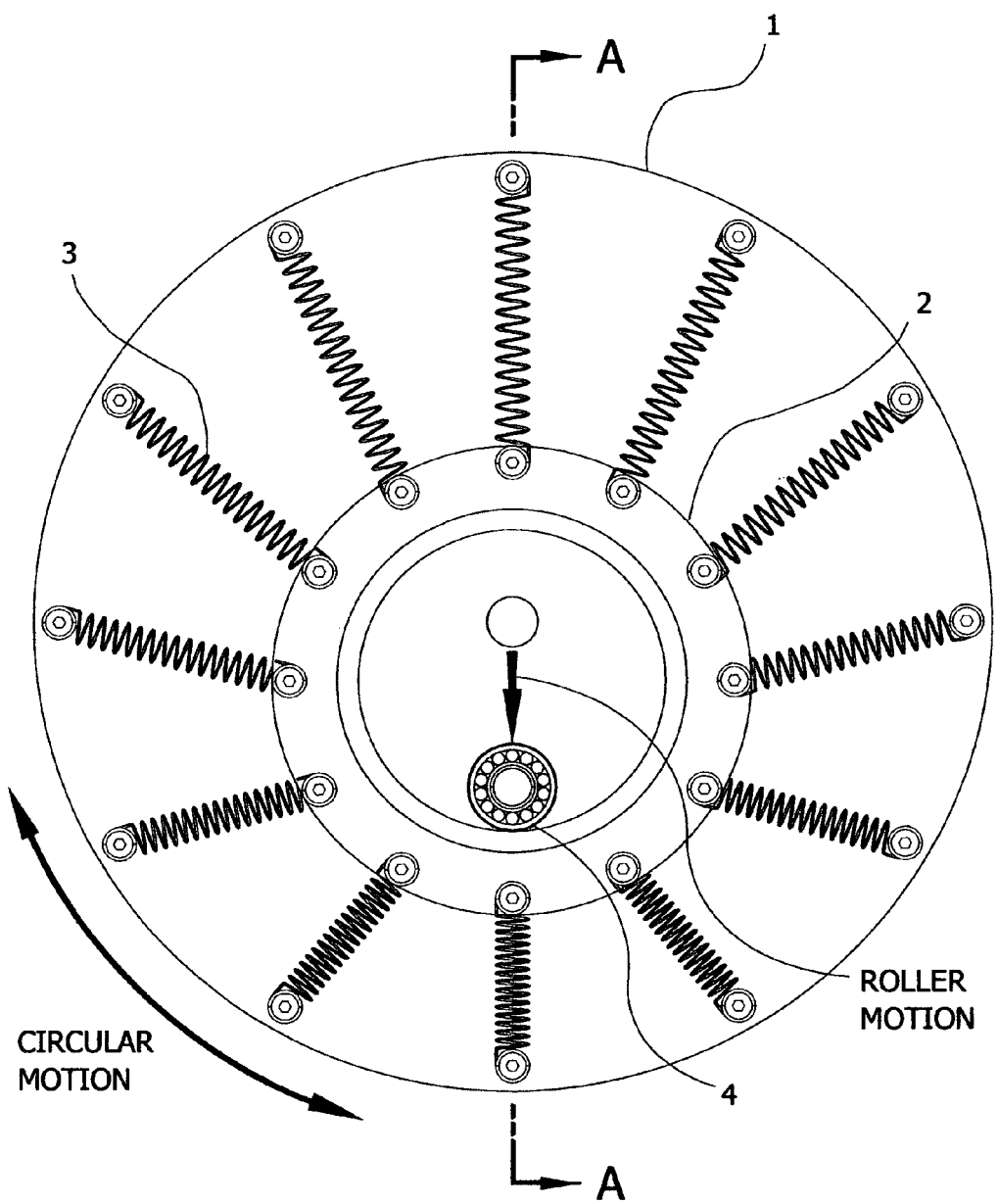

FIG. 3 shows the ring 2 having been forced by the motion of the roller 4 into an eccentric position, thus deforming (stretching or compressing) the elastomeric suspension.

Figure 4:
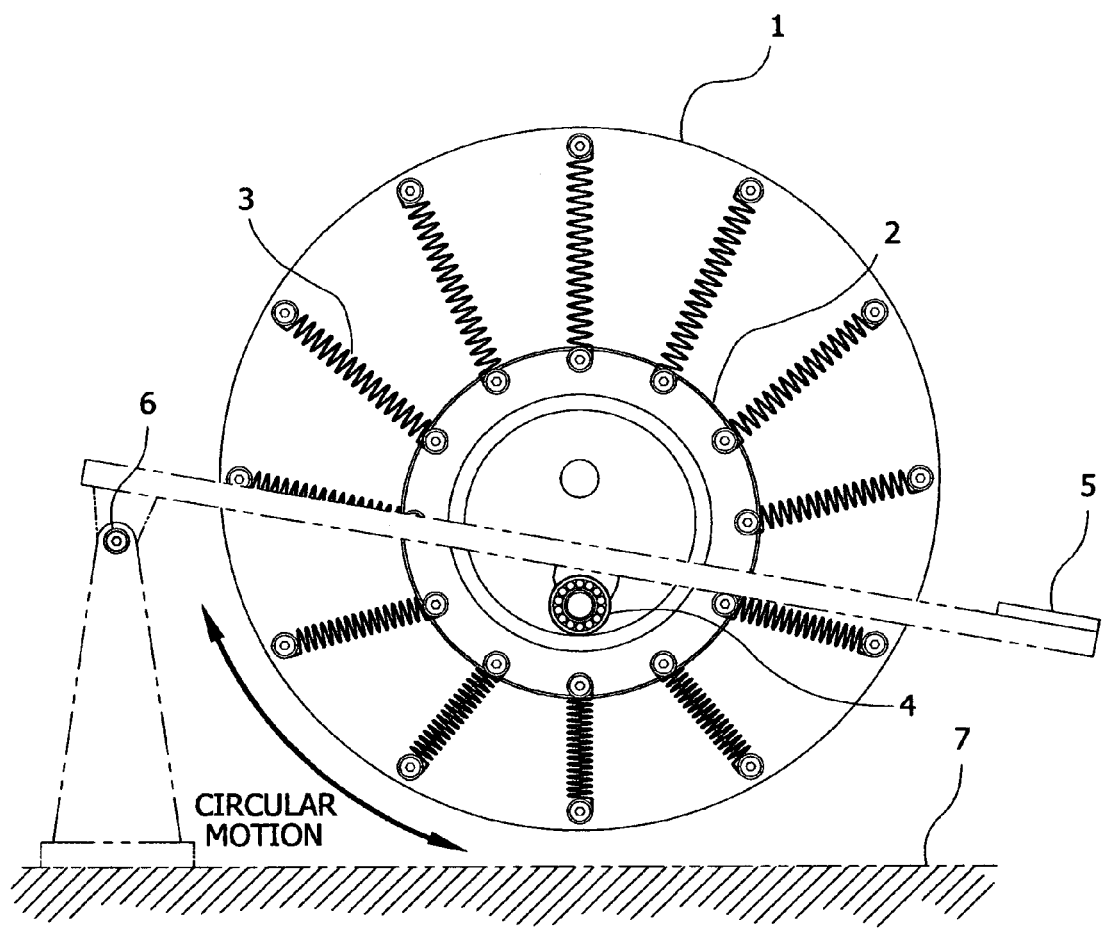

FIG. 4 In order to facilitate the comprehension of this invention, this drawing features a fake brake pedal 5, a fake pivot 6 and a fake support 7 to represent in a symbolic and schematic fashion how the action of pushing on a brake pedal can create the force that moves roller 4.

FIG. 5 shows a modified form of construction as an obvious alternate configuration with the elastomeric suspension 3 located on the inside of ring 2 and roller 4 riding outside the ring. The function and all claims are identical since the hardware has simply been reversed inside out.

DETAILED DESCRIPTION OF THE INVENTION

This invention pertains to a unique brake mechanism that uses no friction whatsoever to slow down or to stop the rotation of a wheel.

The simplified schematic diagrams shown here do not intend to apply specifically to any given type of vehicle or to any particular manufacturer. The purpose of these drawings is to describe the invention in general terms. In all cases the actual design of the hardware will be the responsibility of the user or of the manufacturer.

Basic Parts

Wheel 1: In this text, the word wheel applies to any circular or near circular object that would be typically part of or connected to a vehicle tire in a manner chosen by the manufacturer. The wheel can be made of any material, metal, plastic, composite, ceramic, glass, wood or any other solid compound.

Ring 2: In this text, the word ring applies to any circular or near circular object suspended from wheel 1 by elastomeric means 3. The ring can be made of any material, metal, plastic, composite, ceramic, glass, wood or any other solid compound.

Elastomeric Suspension 3: In this text, the word suspension applies to any of the following items, used singly or in combination, located in such a way that if no radial force is applied to ring 2, this ring is concentric to wheel 1: extension springs, compression springs, leaf springs, torsion springs, elastic bands, clock (spiral) springs, bellows, web elastomer, solid elastomer, foam elastomer, a gas, gel or liquid filled enclosure, air or hydraulic cylinders or any other device or compound that, if displaced or deformed exerts a force to regain its original shape, length or position. The elastomeric suspension may be attached to wheel 1 and to ring 2 by means of screws, bolts, rivets, welds, clamps, retaining rings, press fit, bonding agents or any other mechanical or chemical manner.

Roller 4: In the preferred embodiment, a ball bearing or a roller bearing is used to minimize friction and wear. The support and radial actuation of this roller is not part of this claim and would be left to the vehicle manufacturer, for example using existing hydraulic lines presently actuating brake pads.

Functioning of the Invention

If no radial force is applied to ring 2, it stays concentric to wheel 1 which then rotates freely.

When roller 4 moves radially, it forces ring 2 off center, thus stretching or compressing the elastomeric suspension 3 into an eccentric position.

For wheel 1 to keep on rotating, it must fight this force every degree of every turn. As this force is maintained or increases, wheel 1 slows down or stops altogether.

Advantages

Because no friction is involved, the braking force is identical under any weather condition, wet or dry. It would operate the same if immersed in a barrel of oil. It cannot fade or get hot. It will always operate smoothly and reliably. All the components, including elastomers, ball bearings, can be engineered to last the expected life of a vehicle.

Because the design is simple and straightforward, the mass manufacturing of all the parts should result in a cost similar to existing friction brakes.

Other Uses

Although primarily intended for use in vehicles such as cars, trucks, all terrain vehicles, motorcycles, buses, motorhomes, eighteen wheelers, trains, airplanes, etc., this invention could be adapted to any machinery or mechanism presently using friction to slow down or to stop. As an example: a replacement for the drag in fishing reels.

The invention claimed is:

1. An elastomeric brake mechanism, comprising:
    a rotatable wheel having a first side;
    a ring having a first side and a circular roller surface, the ring positioned relative to the wheel such that the first side of the ring is disposed towards the first side of the wheel;
    an elastomeric suspension comprising a plurality of springs disposed around the wheel and coupling the ring to the wheel the elastomeric suspension configured such that a first end of each of the plurality of springs is coupled to the ring and a second end of each of the plurality of springs is coupled to the wheel allowing the ring to move relative to the wheel from a first ring position toward a second ring position; and
    a roller having a circular outer surface disposed toward the roller surface of the ring, the roller configured to move from a first roller position toward a second roller position, the roller outer surface contacting the ring roller surface in both the first roller position and the second roller position such that the movement of the roller from the first roller position towards the second roller position moves the ring from the first ring position towards the second ring position,
    wherein the elastomeric suspension is deformed into an eccentric position by the movement of the ring from the first ring position towards the second ring position.

2. The brake mechanism of claim 1, wherein the plurality of springs are arrayed symmetrically around the wheel.

3. The brake mechanism of claim 1, wherein the plurality of springs comprises twelve springs.

4. The brake mechanism of claim 1, wherein the ring further comprises a second side, and wherein the first end of each spring is coupled to the second side of the ring and the second end of each spring is coupled to the first side of the wheel.

5. The brake mechanism of claim 1, wherein the plurality of springs are extension or compression springs.

6. The brake mechanism of claim 1, wherein the plurality of springs are leaf springs.

7. The brake mechanism of claim 1, wherein the plurality of springs are torsion springs.

8. The brake mechanism of claim 1, wherein the plurality of springs are coupled to the ring and to the wheel with one of screws, bolts, rivets, welds, clamps, or retaining rings.

9. The brake mechanism of claim 1, wherein the elastomeric suspension is configured to couple the ring and the wheel to allow the ring to move laterally across the first side of the wheel when the ring is moved by the roller from a first ring position towards the second ring position.

10. The brake mechanism of claim 1, wherein the wheel is circular.

11. An elastomeric brake mechanism, comprising:
    a rotatable first element;
    a second element having a circular surface;
    a plurality of elastomeric suspensions coupling the first element to the second element; and
    a third element having an outer surface disposed toward the circular surface of the second element, the third element configured to move from a first position toward a second position,
    wherein the brake mechanism is configured such that the third element exerts a radial force on the second element asymmetrically deforming the elastomeric suspensions when the third element moves from the first position to the second position.

12. The brake mechanism of claim 11, wherein the alignment of the second element is symmetrical to the first element when the third element is in the first position and the alignment of the second element to the first element is not symmetrical when the third element moves toward the second position.

13. The brake mechanism of claim 11, wherein a first side of the first element is disposed towards a first side of the second element.

14. The brake mechanism of claim 11, wherein the first element comprises a circular outer edge.

15. The brake mechanism of claim 11, wherein the elastomeric suspensions comprise a plurality of springs.

16. An elastomeric brake mechanism, comprising:
    a rotatable disc;
    a ring having a circular roller surface;
    a plurality of elastomeric means for coupling the disc to the ring; and
    a roller having an outer surface disposed toward the roller surface of the ring, the roller configured to move from a first position toward a second position,
    wherein movement of the roller from the first position to the second position exerts a radial force on the ring such that the coupling means are deformed into an eccentric position.

17. The brake mechanism of claim 16, wherein the coupling means comprise a plurality of springs.

18. The brake mechanism of claim 16, wherein the coupling means comprise an elastomer.

19. The brake mechanism of claim 16, wherein the coupling means comprise a plurality of hydraulic cylinders.

* * * * *